Nov. 1, 1927.
N. W. PALMER
CULTIVATOR
Filed Nov. 27, 1925
1,647,658
3 Sheets-Sheet 2
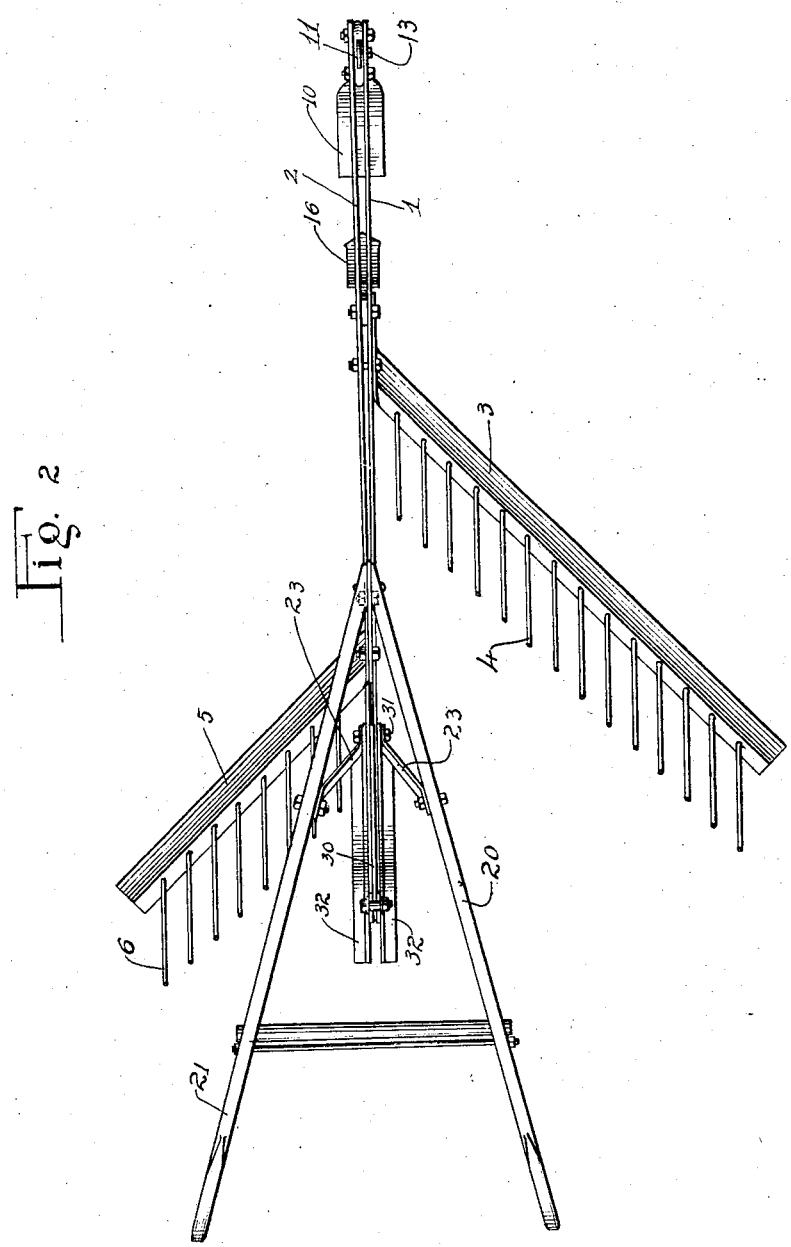

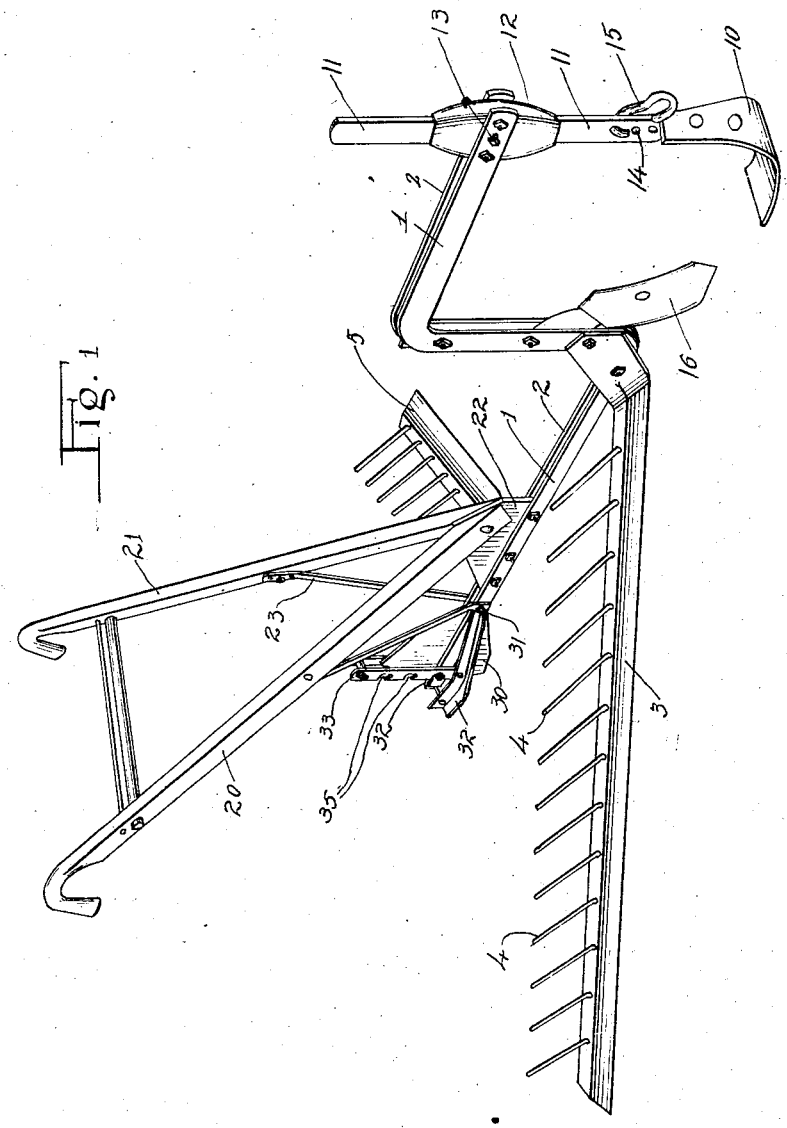

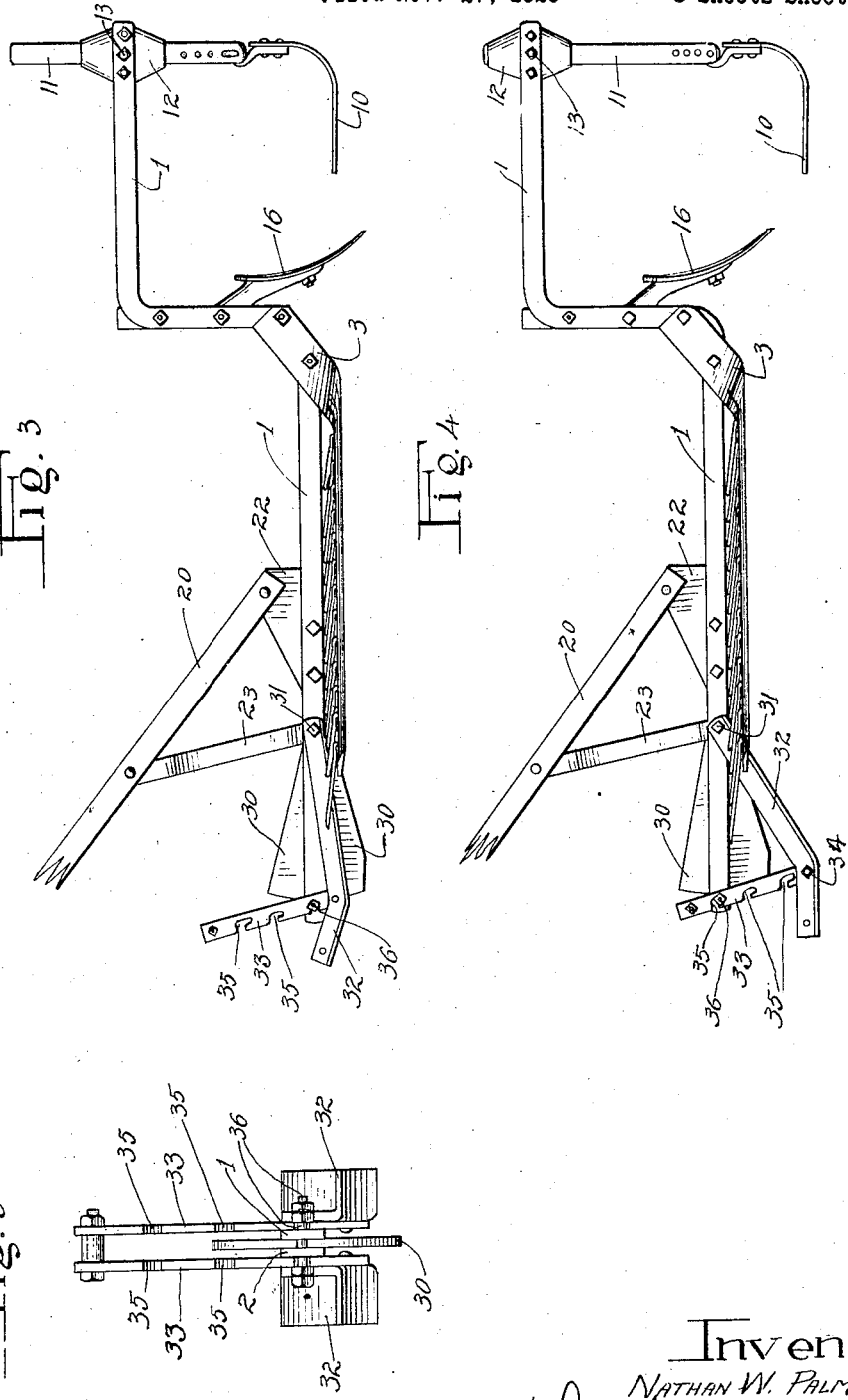

Patented Nov. 1, 1927.

1,647,658

UNITED STATES PATENT OFFICE.

NATHAN W. PALMER, OF MOLINE, ILLINOIS, ASSIGNOR TO MOLINE IMPLEMENT COMPANY, OF MOLINE, ILLINOIS, A CORPORATION OF ILLINOIS.

CULTIVATOR.

Application filed November 27, 1925. Serial No. 71,544.

The invention relates to a cultivator.

It relates particularly to a coffee cultivator, that is, a cultivator used for cultivating ground between coffee trees.

Coffee trees have low, over-hanging branches which make it difficult to get an implement near them without damaging the branches or brushing off the ripening coffee beans. The trees are planted in rows and it is necessary to cultivate the soil between them. This has been done by hand labor because in the absence of a satisfactory implement to be drawn by power, manual labor has been cheaper and does not disturb the coffee trees.

The general object of the present invention is to provide an efficient coffee cultivator that may be drawn by horses, mules, or other draft power.

Other objects and advantages of the invention will appear from the specification and drawings.

The embodiment of the invention is shown in the accompanying drawings in which

Figure 1 is a perspective view of the cultivator.

Figure 2 is a plan view.

Figure 3 is a side elevation showing the cultivator in working position.

Figure 4 is a side elevation showing the cultivator in transport position.

Figure 5 is a rear view of the lower rear end of the cultivator.

The cultivator includes a body member which is preferably made of two flat metal bars 1 and 2 bolted together at various points and extending longitudinally of the cultivator to form what may be termed a longitudinal body member. The main portion of the body member lies close to the ground. The bars forming it are bent upwardly near the front end of the cultivator and then forwardly to form an offset portion as illustrated in Figure 1. This construction is simple and inexpensive inasmuch as the metal required is simply two flat metal bars and the operations of converting them into the body member are mainly those of bending, drilling holes, and bolting the parts together. A further advantage of the construction is that the body member is narrow and it contributes to making the whole cultivator a narrow implement that may pass readily through narrow spaces between the trees.

The devices for cultivating the ground must be such as to cultivate under the branches of the coffee trees but it is not possible to support the cultivating devices by braces or other parts which will strike the branches. In order that this may be accomplished there has been provided a cultivating knife 3 firmly attached to the body member near its forward end and extending diagonally rearward. This cultivating knife or blade is relatively long and flat so that it will extend under the branches of the trees and cut through the soil without disturbing the branches. Its operating depth is regulated so that it cuts through the soil under the surface to destroy the weeds and the soil passes up over the blade and is broken up and separated by the fingers 4 which extend rearwardly from the rear side of the blade.

A similar cultivating knife 5 is attached to the body member toward the rear of the cultivator. This knife is shorter than the one first described and it extends from the opposite side of the body member. Its construction and operation are the same as that of the knife 3 and it carries fingers 6 similar to the fingers 4 on the knife 3.

The staggered location of the knives tends to stabilize the cultivator when it is resting on the ground and when it is working. The long knife cultivates under the trees at one side while the short knife cultivates a portion of the soil between the rows. The cultivator is used between the rows of trees and, when the operator comes down on one side, he cultivates under the trees on one side and also cultivates a portion of the soil between the trees. He comes back in the same row and cultivates the soil under the trees on the opposite side and the remainder of the soil between the rows, or, if the rows are close together, some of the soil between the rows may be recultivated in the second trip between the trees.

It will be observed that the body of the cultivator is very narrow and that there are no projecting members to engage the branches. Accordingly, the implement can be used between trees that are relatively close together without disturbing the branches.

In order to adjust the depth of the forward end of the cultivator, a depth gauge or shoe is provided which includes a sliding shoe member 10 connected to a shank 11 that is adjustably held in a socket member 12 by a set screw 13. This depth gauge or shoe prevents the front end of the cultivator from digging too deeply into the ground and by varying the adjustment of the shoe it is possible to vary the depth of cultivation. The depth gauge also serves the additional purpose of providing a hitch connection. It is provided with a series of holes 14 to receive a clevis or hook member 15 to which the draft means is connected. The gauge thus enables the draft connection to be located relatively low and to be adjusted to suit the requirements. This gauge also serves to support the front of the cultivator while it is being transported.

In order to stir up the soil which might be packed slightly by the depth gauge, a shovel 16 is mounted on the body member directly behind the depth gauge to loosen any soil that may be packed by the shoe 10.

The cultivator is manipulated by means of handles 20 and 21 which converge forwardly and are connected to a plate 22 bolted between the bars 1 and 2 of the body member. Braces 23 are provided for rigidly holding the handles in position.

The cultivator is further stabilized and its straight line operation insured by means of a plate 30 bolted rigidly to the rear of the body member and extending below it. This plate acts as a keel to keep the rear end of the cultivator from moving about and for enabling it to be easily kept in a straight line position while it is being drawn forward.

A depth gauge and shoe which also serve as a transporting device are provided for the rear of the cultivator. Pivoted to the body member at 31 is a pair of arms 32 which carry upwardly extending links 33 pivoted to the arms at 34. These links are provided with a series of notches 35, the number of which may be varied, which co-operate with a cross pin or bolt 36 carried by the cultivator body member. When the cultivator is in working position, the shoes 32 are in the position shown in Figure 3. In this position, the shoes ride on the surface of the ground and tend to support the rear end of the cultivator. This support is very slight unless it is desired to cultivate very shallow in which case the links may be adjusted so that the second set of notches co-operate with the bolt 36 which lowers the shoes 32 so as to raise the rear end of the cultivator.

When it is desired to transport the cultivator, it is desirable to raise the cutting knives as high off the ground as possible. In order to do this, the operator moves the links 33 forward and presses down on the shoe members 32 until the last set of notches 35 engage the pin 36. This may be quickly done by the operator by pressing down on one of the shoe members 32 with his foot while raising upwardly on the handle. The pin 36 carries the arms 33 forward and slides out of the notches 35 after which it again enters one of the upper notches when the implement reaches its raised position as shown in Fig. 4, at which time the links 33 fall over the pin by gravity. The relation of the parts in this position is shown in Figure 4 from which it will be clear that the rear end of the cultivator is thus held raised on the shoes 32 and the knives 3 and 5 are held high enough above the ground so that the cultivator may be transported without cultivating the ground over which it is being moved.

If the cultivator is to be transported for some distance, the front gauge is also moved down to the position shown in Fig. 4 so that both ends of the cultivator are held above the ground. If the distance to be transported is short, only the rear of the cultivator need be raised as this will raise the knives sufficiently high to prevent them from cultivating the ground while the implement is being transported.

It will be noted that the narrowness of the body member permits the knives 3 and 5 to cultivate practically all of the ground leaving only a very narrow strip uncultivated, and this strip is taken care of by the shovel 16. The depth of cultivating can be adjusted by means of the front gauge or shoe and also by means of the rear gauge or shoe. In this way the position of the knives can be varied to suit different conditions.

The knives serve to stabilize the cultivator and the plate 30 tends to keep it in a straight line position. The rear shoes 32 co-operate with the plate 30 to stabilize the rear of the implement. The parts are all simple. They are made relatively light and the cost is not great, but they co-operate to produce an implement which is efficient in operation and one that can be used between coffee trees without damaging them.

It is to be understood that the structure shown is for purposes of illustration and that variations may be made in it without departing from the spirit and scope of the invention as defined by the claims.

I claim:

1. A cultivator having a longitudinal body member, cultivating knives extending outwardly on opposite sides of said body member, operating handles connected to said body member, a depth gauge for varying the position of the front end of the body member, and a depth gauge for the rear of the body member; said rear depth gauge having adjustable connections to the body member by means of which it may be adjusted to support the rear of the cultivator in transport position.

2. A cultivator having a body member, a relatively long cultivating knife extending diagonally rearward from one side of the member, a shorter cultivating knife extending diagonally rearward on the other side of the body member, an adjustable shoe connected to the forward end of the member for regulating the depth of the front end of the cultivator, a cultivating shovel carried by the body member and located behind said shoe, an adjustable shoe carried by the rear of the body member for regulating the depth of the rear of the cultivator, and handle members connected to the body member.

3. A cultivator having a body member comprising longitudinally located metal bars which are bent upwardly at their forward ends and extend forwardly to form an offset portion, an adjustable shoe connected to said offset portion of the body member, a cultivating knife connected to the body member toward its front end and extending diagonally rearwardly on one side of the body member, a second cultivating knife connected to the body member to the rear of the first and extending diagonally at the rear on the opposite side of the body member, an adjustable shoe carried by the rear of the body member for varying the height of said member above the ground, and operating handles connected to the body member and extending upwardly and rearwardly.

4. A cultivator having a body member bent upwardly at its forward end and extending forwardly, an adjustable shoe connected to said forwardly extending portion, a cultivating knife connected to the body member at the upward bend thereof and extending laterally to one side, a handle connected to the body member, a second cultivating knife connected to the body member at the juncture of the connection of the handle member, and an adjustable depth gauge connected to the rear end of the body member.

5. A cultivator having a body member bent upwardly at its forward end and extended forwardly, an adjustable shoe connected to the forward end of the body member and provided with a draft connection, a cultivator shovel connected to the upwardly extending portion of the body member and positioned behind said shoe, a cultivating knife connected to the body member toward its front end and extending diagonally rearward to one side, a second cultivating knife connected to the body member to the rear of the first and extending diagonally to the rear on the opposite side, an adjustable shoe carried by the rear of the body member for varying the height of said member above the ground, and operating handles connected to the body member and extending upwardly and rearwardly.

6. A cultivator having a single, long, narrow body member, which, in working position, is in close proximity to the ground, a cultivating knife extending diagonally rearward from one side of said member, another cultivating knife extending diagonally rearward from the opposite side of said member, a keel plate for the rear of said body member, a depth gauging shoe at the front of the body member, a draft connection connected to said shoe, and a depth gauging device for the rear of the body member, said last named device including adjustable connections to the body member by means of which it may be moved to a position to support the rear end of the cultivator in transport position.

In testimony whereof I affix my signature.

NATHAN W. PALMER.